United States Patent Office 3,334,131
Patented Aug. 1, 1967

3,334,131
PROCESS FOR THE PREPARATION OF METHYL ESTERS OF AROMATIC POLYHALOGEN CARBOXYLIC ACIDS
Rudolf Burkhardt, Witten (Ruhr), Germany, assignor to Chemische Werke Witten, GmbH, Witten (Ruhr), Germany
No Drawing. Filed Feb. 12, 1963, Ser. No. 257,869
Claims priority, application Germany, Mar. 9, 1962, C 26,442
9 Claims. (Cl. 260—475)

The present invention is directed to a process for the preparation of methyl esters of aromatic polyhalogen carboxylic acids.

One of the best known methods for the preparation of alkyl esters of aromatic carboxylic acids which are halogenated in the nucleus is the reaction of the corresponding halogen carboxylic acid halides with aliphatic alcohols. While the reaction does not take place as rapidly as that of aliphatic carboxylic acid halides with alcohols, it can usually be accelerated sufficiently by heating.

However, when using this method for the preparation of the methyl esters of some polyhalogen benzene carboxylic acids, it has been noted that carboxylic acid chlorides, the aromatic nucleus of which has both ortho positions with respect to the carbonyl chloride group occupied by halogen atoms, reacted considerably more slowly with methanol than those in which one or both or ortho positions were not halogenated. In many instances, the methyl esters were formed only after boiling the methanolic acid chloride solutions for several days. As to the 2,4,6-trichlorobenzoyl chloride, it has even been reported that it could not be reacted with methanol at all. The strong decrease of the reactivity was believed due to a local hindrance of the carbonyl chloride group by the two neighboring halogen atoms. Beter known examples of such slow-to-react carboxylic acid chlorides are pentachlorobenzoyl chloride and tetrachloroterephthaloyl chloride, which may be recrystallized, for example, from methyl or ethyl alcohol practically without losses by ester formation. For the conversion into the methyl esters, a 10 to 30-hour boiling of their methanolic solutions is necessary. Since a high requirement of reaction space, due to the low solubility of the carboxylic acid chlorides in methanol, is also added to the low reaction velocity, the space-time yield of this simple esterification reaction is very low.

The addition of hydrogen chloride-binding bases as a possibility for accelerating the reaction of carboxylic acid chlorides with organic hydroxyl compounds is known from the Schotten-Baumann, reaction. It is also known from this reaction, however, that the use of aqueous sodium hydroxide as a hydrogen chloride acceptor always leads to the saponification of a greater or smaller portion of the carboxylic acid chlorides, but that this undesirable side reaction will, however, not occur when the reaction is carried out under water-free conditions, for example, with pyridine as the base. This recognition formed the basis for the development of a series of esterification processes which are all characterized by the common feature of the absence of water. As hydrogen chloride-binding agents, both inorganic and organic compounds are used, particularly tertiary amines and alkali metal alcoholates.

A process for the preparation of the tetrachloroterephthalic acid dimethyl ester based on the same assumptions has been described more recently. In this process, melted tetrachloroterephthalic acid dichloride is reacted with methanol and the methanolic solution of an alkali metal methylate. Instead of the methylate, it is possible to also utilize the hydroxyl compound of an alkali metal from which the desired methylate is to be formed in the methanolic solution in situ. The advantage of this process as compared to the reaction carried out without a hydrogen chloride acceptor consists mainly in the considerably lower requirement of methanol and thus also of reaction space. The shortening of the reaction time from about 10 hours to 7 to 8 hours is less marked. Disadvantages of the process reside in the difficulty of the addition of the melted acid chloride, which is at a temperature of about 150° C., to the relatively small amount of methanol, as well as in the processing of metallic sodium, or the sodium methylate, which is equally not free from danger. The sodium hydroxide solutions, which may be utilized in the place of the sodium methylate solutions, and which are methanolic to about 25%, have the disadvantage that they are homogeneous only when hot. During cooling, deposits are formed and the concentration of the solution is altered. Also, obstructions of tubing and pipe lines, etc., may occur.

It has now been found in accordance with the present invention that methyl esters of aromatic polyhalogen carboxylic acids, especially the benzene carboxylic acids, may be prepared rapidly and with a good yield when such aromatic polyhalogen carboxylic acid chlorides, the aromatic nucleus of which has the hydrogen atoms orthopositioned with respect to the carbonyl chloride group or groups replaced by halogen, are suspended in methanol and treated at boiling temperature with water and an amount of hydroxides, oxides or carbonates of the alkali or alkaline earth metals which is sufficient to bind the resulting hydrogen chloride.

Surprisingly, the presence of water does not lead, under these conditions, to the saponification of the acid chlorides by the inorganic base, but to a reaction velocity which is many times increased as compared to the reaction carried out without the addition of a base, or with the addition of a base but in the absence of water. Since the amount of methanol does not have to be sufficient to dissolve, but only to suspend the acid chlorides, and, respectively, the methyl esters resulting therefrom, the reaction space may be kept relatively small. There results thus a very favorable spacetime yield which, together with the high reaction velocity, is superior to the heretofore known, technically utilizable processes.

The process according to the present invention is critical both with regard to the acid chloride and to the alcohol component. If aromatic halogen carboxylic acid chlorides in which only one of the ortho positions with respect to the carbonyl chloride groups is occupied by a halogen are reacted with methanol under the conditions indicated, the reaction takes place in the usual manner, i.e., under partial saponification of the acid chlorides. The repression of the saponification is not, however, due exclusively to the decrease of the reactivity of the carbonyl chloride groups by the neighboring halogen atoms, but is tied, surprisingly, also to the use of methanol as an alcoholic component. That is, the aromatic carboxylic acid chlorides which are halogenated in both ortho positions react with higher aliphatic alcohols with the formation of saponification products and a corresponding reduction of the ester yield. This is evident in the reaction with ethanol and applies to higher alcohols to an increased extent.

The criticality of the process with respect to the acid chlorides has a very favorable effect on the purity of the methyl esters produced. Impurities by acid chlorides not being halogenated in both ortho positions with respect to the carbonyl chloride group do not, for the most part, find their way into the end product. Thus, the methyl esters are obtained, for instance, from crude pentachlorobenzoyl chloride or tetrachloroterephthalic acid dichloride in a purity which can be attained in an esterification without the addition of a base only by additional recrystallization and with a correspondingly lower yield.

When departing from crude halogen dicarboxylic acid chlorides, which still contain the iron halide used as halogenation catalyst, methyl esters are obtained which are not purely white, but brownish. This discoloration is caused by the catalyst residues which have remained in the end product and which pass over into difficulty soluble basic iron compounds.

It has now been found that the brown coloration of the methyl esters made from such starting materials according to the present invention may be prevented when using, either prior to, during or after the esterification reaction, compounds which form, with iron, complex compounds which are only slightly colored and/or which are capable of being washed out with water. Suitable complex formers are, for example, water-soluble salts of phosphoric acid, hydrofluoric acid, oxalic acid, lactic acid, tartaric acid, or the free acids.

The method of carrying out the process in accordance with the present invention, which is described in the following examples, offers no technical difficulties whatsoever. The mostly crystalline, aromatic halogen carboxylic acid chlorides are suspended in methanol while stirring vigorously, and the base and water are added at boiling temperature either together or one after the other. The amount of methanol used is suitably chosen so large that the reaction mixture is well stirrable both before and after completion of the reaction. During the addition of the aqueous bases and, respectively, the water, when water-free bases, for example, $K_2CO_3$, $Ca(OH)_2$, etc. have been added, no supply of heat or only a small or limited supply of heat is needed since the mixture is heated by the exothermic reaction. The methyl esters are obtained in finely crystalline form and are washed with water and dried at normal or reduced pressure. Some liquid acid chlorides, for example, 2,6-dichlorobenzoyl chloride, or 2,3,6- and, respectively, 2,4,6-trichlorobenzoyl chloride, may also be esterified in the manner described. If the methyl esters are obtained in liquid form, they may be precipitated by the addition of water, if desired after distillation of a portion of the methanol, and separated in the usual manner.

The high velocity with which the desired methyl esters are formed from the acid chlorides and methanol in the presence of aqueous bases also renders possible a continuous operation of the process. The correct quantitative proportion of acid chloride to base may thereby be easily controlled by measuring the pH value in the reaction mixture.

Many uses of the methyl esters produced according to the present invention are known. For example, the methyl esters of aromatic polyhalogen carboxylic acids are utilized as herbicides; they are also suitable as intermediate products for the preparation of compounds with herbicidal, insecticidal or fungicidal effect, as well as difficulty inflammable polycondensation products.

It is the primary object of the present invention, therefore, to provide a process for the production of methyl esters of polyhalogen carboxylic acids having a high reaction velocity.

Other objects of the invention will become apparent from the following examples which serve to further illustrate the invention without, however, limiting the same.

EXAMPLE I 100 grams of pentachlorobenzoyl chloride and 600 ml. of methanol were heated to boiling while stirring, and a solution of 13.4 grams of sodium hydroxide in 15 ml. of water was added thereto dropwise within 30 minutes. After the addition, the mixture was boiled for another 5 minutes, subsequently cooled to 20° C., and 200 ml. of water was then stirred thereinto. After suctioning, the filter residue was stirred for 10 minutes with 200 ml. of water, which had been made slightly alkaline with a few drops of sodium carbonate solution, suctioned again and rewashed twice on the filter with 50 ml. of water each time. After drying in a vacuum drying chamber at 50–60° C., 93.6 grams of pentachlorobenzoic acid methyl ester (equal to 95% of the theoretical yield) was obtained, having a melting point of 96–97° C.

EXAMPLE II 500 grams of tetrachloroterephthalic acid dichloride having a melting point of 144° C. was heated to boiling with 3 liters of methanol, and a solution of 122 grams of sodium hydroxide in 122 ml. of water was added thereto without further supply of heat in such a manner that the mixture was kept briskly boiling. The reaction mixture was stirred for another 10 minutes at boiling temperature and cooled at 20° C. One liter of water was added thereto, and the reaction mixture was suctioned. The crystalline filter residue was stirred for 10 minutes with 1 liter of water at 45°, suctioned again, successively washed with 100 ml. of water and 200 ml. of methanol, and dried at 100°. Yield of tetrachloroterephthalic acid dimethyl ester: 470 g., equal to 96.5% of the theoretical yield; melting point: 154° C.; saponification number: 337 (calculated, 338); chlorine content: 42.9% (calculated, 42.7%).

EXAMPLE III 300 grams of a product which is liquid at room temperature and consisting mainly of the isomeric tetrachlorobenzoyl chlorides was mixed with 1.5 liters of methanol and the mixture heated to boiling. 86 grams of a 50% aqueous sodium hydroxide solution was then added thereto dropwise without heating and within 30 minutes and 750 ml. of methanol was subsequently distilled off. By the addition of 500 ml. of water, the methyl ester produced was precipitated as a heavy, oily liquid which solidified to a crystalline mass drying in the cold. Yield 252 g.; chlorine content: 52.4%; saponification number: 205. During the vacuum distillation, the main portion passed over at 124–126° C. at 3 torr.

EXAMPLE IV 340 grams of tetrachloroterephthalic acid dichloride was heated to boiling with 2 liters of methanol while stirring and a solution of 138 grams of water-free potassium carbonate in 140 ml. of water was added thereto dropwise within one hour. After the addition, the mixture was boiled for another 15 minutes, cooled to 25° C., and stirred with 780 ml. of water for 5 minutes. The finely crystalline product was suctioned, mixed with 350 ml. of water, suctioned again, rewashed on the filter with 100 ml. of water and dried in the vacuum drying chamber at 60–70° C. Yield of tetrachloroterephthalic acid dimethyl ester: 309 g.; melting point: 154.5°.

EXAMPLE V 50 ml. of water was added dropwise to a boiling mixture of 170 grams of tetrachloroterephthalic acid dichloride, 38 grams of calcium hydroxide and 1 liter of methanol within 45 minutes. Thereafter, the mixture was boiled for another 45 minutes while stirring at reflux and cooled to 20° C. 400 ml. of water was stirred thereinto and the reaction mixture was suctioned. The filter residue was stirred with 400 ml. of water and 1 ml. of glacial acetic acid for 10 minutes at 40°, suctioned again and rewashed twice with 150 ml. of water each time. Yield of dried tetrachloroterephthalic acid dimethyl ester: 155 g.; melting point: 155° C.

EXAMPLE VI 360 grams of a crude chlorination product obtained from terephthalic acid dichloride, which contained approximately 90% tetrachloroterephthalic acid dichloride and approximately 0.4% of the iron (III) chloride added as chlorination catalyst, was heated to boiling while stirring with 2.2 liters of methanol and 8 grams of pulverized Na₃PO₄·12H₂O. Heating was then interrupted and 170 grams of a 50% aqueous sodium hydroxide solution was added thereto dropwise within 45 minutes, while the mixture was maintained at boiling temperature. Subsequently, the mixture was heated for another 5 minutes to boiling, then cooled to 20° C., stirred with 700 ml. of water for 10 minutes and suctioned. The filter residue was mixed twice with 400 ml. of water each time, suctioned and then rewashed again twice on the filter with 150 ml. of water each time. After drying in a vacuum drying chamber at 60–70° C., 301 grams of tetrachloroterephthalic acid dimethyl ester was obtained a white, crystalline powder having a melting point of 153–154° C. and a saponification number of 335. The yield corresponds to 85.8% of the theoretical based on the amount of crude acid chloride, and about 95.4% of the theoretical, based on the contents thereof of pure tetrachloroterephthalic acid dichloride. The same starting product yielded— without the addition of sodium phosphate and under otherwise identical conditions—an ester of brown color due to the presence of the iron compounds.

EXAMPLE VII 720 grams of the starting product employed in Example VI was heated to boiling with 4.2 liters of methanol while stirring and 342 grams of a 50% sodium hydroxide solution was added thereto within one hour and without further supply supply of heat. Thereafter, the mixture was boiled for another 15 minutes under reflux, then cooled to about 15° C., and stirred for 15 minutes at that temperature. The brown ester was centrifuged off, stirred for 10 minutes with a solution of 5.5 grams of oxalic acid dihydrate in 1.5 liter of water, which was maintained at a temperature of 45° C. centrifuged off again and rewashed on the centrifuge with 1 liter of water. After drying at 110° C., 560 grams of a practically colorless tetrachloroterephthalic acid dimethyl ester was obtained, which melted at 153–154° C.

The methanolic filtrate obtained from the first centrifuging operation was made up with fresh methanol to 4.2 liters and employed for another experiment carried out as described hereinabove. Yield of tetrachloroterephthalic acid dimethyl ester: 606 g.

While the invention has been described with reference to a number of examples thereof, it will be understood that changes may be made in carrying out the process without departing from the scope of the invention, and it is intended that all matter contained in the above description shall be interpreted as illustrative and not in a limiting sense.

I claim:
1. A process for the preparation of the methyl ester of a polyhalogen benzene carboxylic acid having the hydrogen atoms in both ortho positions with respect to each carbonyl group present replaced by halogens which comprises suspending the acid chloride of said polyhalogen benzene carboxylic acid in methanol and boiling the suspension so formed with water and a predetermined amount of a basic hydrogen chloride acceptor for a period of time sufficient to esterify said acid chloride, said basic hydrogen chloride acceptor being selected from the group consisting of the alkali and alkaline earth metal hydroxides, oxides and carbonates, and said predetermined amount of said basic hydrogen chloride acceptor being sufficient to bind the hydrogen chloride freed in said esterification.

2. A process as defined in claim 1, wherein said acid chloride is tetrachloroterephthalic acid dichloride.

3. A process as defined in claim 1, wherein said acid chloride is pentachlorobenzoyl chloride.

4. A process as defined in claim 1, wherein said acid chloride is tetrachlorobenzoyl chloride.

5. A process as defined in claim 1, wherein said acid chloride is a crude polyhalogen benzene carboxylic acid chloride containing iron impurities and wherein a compound capable of forming a water-soluble or only slightly colored complex with iron is added to the suspension to prevent the brown coloration of the resultant methyl ester by said iron impurities.

6. A process as defined in claim 5, wherein said compound is selected from the group consisting of phosphoric acid, hydrofluoric acid, oxalic acid, latic acid, tartaric acid, and the water-soluble salts thereof.

7. A process as defined in claim 5, wherein said compound is added to said mixture prior to the esterification reaction.

8. A process as defined in claim 5, wherein said compound is added to said mixture during the esterification reaction.

9. A process as defined in claim 5, wherein said compound is added to the reaction mixture after the esterification reaction.

References Cited
FOREIGN PATENTS
244,456  2/1961  Australia.

LORRAINE A. WEINBERGER, *Primary Examiner.*
RICHARD K. JACKSON, *Examiner.*
THOMAS L. GALLOWAY, *Assistant Examiner.*